Sept. 26, 1967     J. H. MYERS     3,343,214
ADJUSTABLE PRESSURE EXTRUDING DIE
Filed Aug. 24, 1965
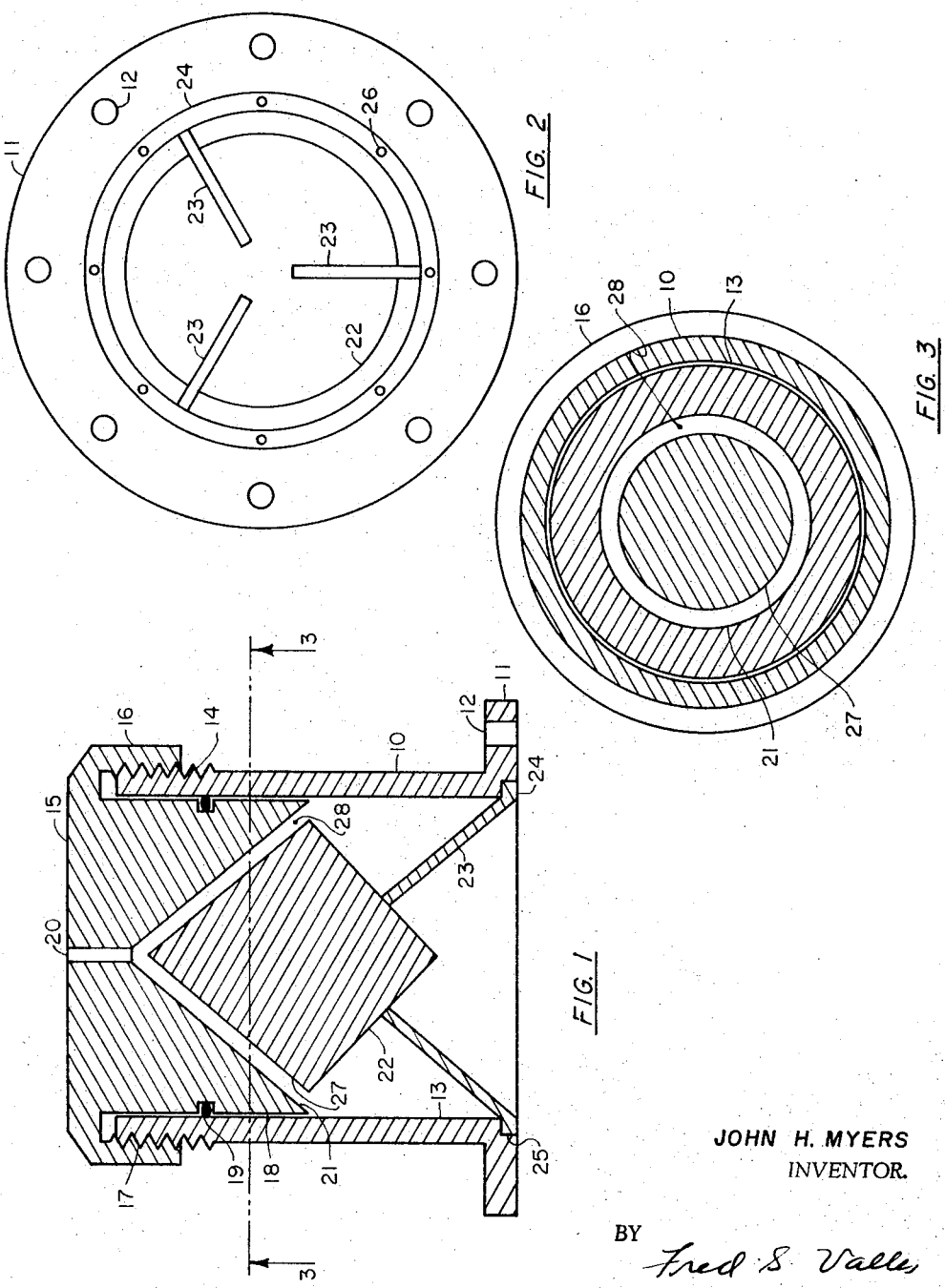
JOHN H. MYERS
INVENTOR.
BY Fred S. Valles
Attorney 3,343,214
ADJUSTABLE PRESSURE EXTRUDING DIE
John H. Myers, Ridgewood, N.J., assignor to Rexall Drug
and Chemical Company, Los Angeles, Calif., a corporation of Delaware
Filed Aug. 24, 1965, Ser. No. 482,065
1 Claim. (Cl. 18—12)

This invention relates to an extrusion die for thermoplastic materials, and more particularly, to an adjustable pressure die for the improved and controlled foam extrusion of said materials.

Foam extrusion of thermoplastic materials is widely known and used in industry. Generally, pellets of the thermoplastic materials containing blowing agents or mixed with such agents in an extruder are subjected to controlled amounts of heat and pressure in the extrusion apparatus so as to be softened and mixed into a uniformly molten mass containing the dispersed blowing agent(s). When extruded, this mixture expands into a much larger and lightweight plastic body which is adapted to be conveyed to a mold for further treatment so as to ultimately provide a surface for a molded article. The extrudate could also be immediately quenched to prevent the expansion of the mass until a subsequent heating step is employed.

A problem which is frequently encountered in prior art foam extrusion apparatuses, is that of foaming of the thermoplastic mass in the extrusion die and farther back in the pressure chamber or adapter. The foaming will generally cause the mass to expand and coalesce within the apparatus, resulting in detrimental congestion which will prevent the smooth extrusion of the thermoplastic materials and necessitate frequent dismantling and cleaning of the apparatus. This disadvantageous foaming results from the inability of prior art foam extrusion apparatuses to provide means which will permit instantaneous and controlled variations in internal extrusion die pressures for the regulation of the foam extrusion material flow.

The extrusion die according to this invention overcomes the foregoing problem encountered in prior art apparatuses by providing an extrusion die having adjustable pressure regulating means which will prevent foaming too far back in the die or in the extruding apparatus attached thereto. In particular, the present extrusion die includes the facility of permitting the dimensional adjustment and variation of the internal material flow passages leading to the die orifice. This can be accomplished in a simple manner through external manipulation of the extrusion die designed to keep maximum extrusion die pressure drops advantageously near the die orifice.

Basically, the extrusion die according to this invention has a material passageway leading to an extrusion die orifice. A stationary member is interposed in the passageway to restrict the latter in a predetermined manner. A die closure cap in which the die orifice is located is adapted to be movably adjustable with respect to the stationary member. This, in effect, will vary the dimensions of the die passageway feeding thermoplastic materials to the die orifice, and resultingly, facilitate the regulation of pressures within the extrusion die.

Accordingly, it is an object of the present invention to provide an improved extrusion die for the foam extrusion of thermoplastic materials.

It is a further object of the present invention to provide an extrusion die for thermoplastic material having means for adjusting the internal pressure of the die.

A more particular object of the present invention is to provide a die for the foam extrusion of thermoplastic materials having easily operable external means for adjusting and controlling the internal pressure of the extrusion die.

The manner in which these and other objects and advantages of this invention will be attained will become apparent from the following detailed description and drawing, in which:

FIGURE 1 is a cross-sectional view of the extrusion die according to this invention;

FIGURE 2 is an elevational end view of the extrusion die as shown in FIGURE 1; and FIGURE 3 is a sectional view on line 3—3 of FIGURE 1.

Referring now in particular to the drawings, the present device includes a die housing 10. The die housing 10 has an annular flange 11 integral therewith adapting it to be attached to an extruding apparatus. For this purpose a series of circumferentially spaced bolt holes 12 may be provided in the flange 11.

A cylindrical passageway 13 extends through the die housing 10. The outer surface of the die housing 10 at the opposite end to the flange 11 may be provided with a series of circumferential threads 14. A closure means or cap 15 is provided at the threaded end of the die housing 10. The closure cap 15 is of a generally cup-shaped configuration, whose lip portion 16 extends over a portion of the housing 10 outer surface. The inner wall of the lip portion 16 is provided with threads 17 adapted to mate in inter-engaging relationship with threads 14 on housing 10.

The inner surface of the cap 15 has a raised cylindrical portion 18 concentric and coextensive with lip portion 16. Cylindrical portion 18 extends into passageway 13, and has an outer diameter which provides a generally close sliding fit with the walls of passageway 13. In order to prevent the leakage between cylindrical portion 18 and passageway 13 of material being extruded, an "O-ring" seal 19 or similar sealing means may be provided.

To facilitate the extrusion of material from the die, a die orifice 20 is provided in the closure cap 15. The die orifice 20 extends through the closure cap 15 so as to be in communication with cylindrical passageway 13. Cylindrical portion 18 has a substantially conical recess 21 formed therein which provides a gradual transition section between the cylindrical passageway 13 and die orifice 20.

A stationary member 22 is positioned in the cylindrical passageway 13 in spaced relationship to the walls thereof, thereby forming a restriction to the free flow of the material being extruded through the die housing 10. The stationary member 22 is attached to the housing 10 by means of a number of radially extending struts 23. The inner ends of the struts 23 may be welded or brazed to the stationary member 22, and the outer ends to a fastening ring 24. Fastening ring 24 may be positioned in an annular recess 25 provided therefor in housing 10. A series of bolts 26 may be used to attach the fastening ring 24 to housing 10, thereby rigidly positioning stationary member 22 in passageway 13.

Stationary member 22 has a configuration which includes a substantially conical portion 27 complementary to recess 21 and extending thereinto in spaced concentric relationship so as to provide an annular passageway 28. The annular passageway 28 forms a transitional passageway between cylindrical passageway 13 and die orifice 20.

Closure cap 15 may be rotated as required along mating threads 14 and 17 which will effect an axial displacement of closure cap 15 relative to the housing 10 and stationary member 22. This, in effect, will vary the distance between the surface of recess 21 and conical portion 27 on the stationary member 22. Consequently, the dimensions and size of annular passageway 28 will be correspondingly affected. As a result, the pressure in the die may be closely controlled by pre-setting the dimensions of the annular passageway 28 as required. This, of course, has the definite advantage during the foam extrusion of thermoplastic materials, in preventing foaming too far back in the die by setting the closure cap 15 at the predetermined distance from the stationary member 22. To facilitate the setting of the closure cap 15, calibration means (not shown) may be provided on the housing. These can be in the nature of numerically calibrated measuring devices, gauges or similar indicating means.

Although only one embodiment of the adjustable die according to this invention has been shown, modifications thereof become readily apparent to one skilled in the art.

Thus, for example, although the complementary surfaces 21 and 27 on the closure cap 15 and stationary member 22 are shown to be conical, they may quite conceivably be of complementary hemispherical, semi-elliptical or other similar configurations, all of which would provide the advantageous die pressure variations of this invention.

Similarly, the illustration of three struts 23 used to position the stationary member 22 in the passageway 13 is given only by way of example. For practical purposes, any number of struts may be used in accordance with stability and structural requirements of the extruding apparatus.

While particular embodiments of this invention are shown above, it will be understood that the invention is obviously subject to variations and modifications without departing from its broader aspects.

What is claimed is:

In an apparatus for extruding foamable thermoplastic materials, an extrusion die comprising:
 (a) a housing having a substantially cylindrical passageway extending therethrough,
 (b) a stationary member having a conical wall portion and positioned within said cylindrical passageway in spaced concentric relationship to a portion of the walls of said passageway,
 (c) adjustable closure means having a cylindrical portion and a lip portion and having an opening extending therethrough defining a die orifice,
   (1) said cylindrical portion having a conical recess complementary to said conical portion of said stationary member defining an annular passageway therewith in communication with said die orifice, said cylindrical portion extending into said cylindrical passageway and being in generally close sliding relationship to another portion of the walls of said cylindrical passageway,
   (2) said lip portion extending over a portion of the outer surface of said housing and having an inner wall thereof in threadable engagement with said portion of the outer surface of said housing,
 said closure means being movable relative to said housing and said stationary member during the extruding operation whereby the dimensions of said annular passageway can be alternatively increased or decreased,
 (d) sealing means positioned between a portion of the walls of said cylindrical passageway and said cylindrical portion of said closure means for preventing leakage of said materials being extruded, and
 (e) radially extending strut means fastening said stationary member to said housing.

References Cited

UNITED STATES PATENTS

| | | | |
|---|---|---|---|
| 830,201 | 9/1906 | Blondel | 18—13 |
| 1,484,961 | 2/1924 | Peelle | 18—12 |
| 1,679,545 | 8/1928 | Roth | 18—14 |
| 1,769,730 | 7/1930 | Wetmore | 18—12 |
| 2,115,940 | 5/1938 | Burry | 18—12 X |
| 2,141,005 | 12/1938 | Lussie | 18—14 |
| 2,501,690 | 3/1950 | Prendergast | 18—13 X |
| 2,770,836 | 11/1956 | Hankey | 18—12 |
| 2,815,033 | 12/1957 | Braunlich | 18—13 X |

FOREIGN PATENTS

| | | |
|---|---|---|
| 810,287 | 3/1959 | Great Britain. |
| 102,397 | 8/1963 | Norway. |

WILLIAM J. STEPHENSON, *Primary Examiner.*